US011475405B2

United States Patent
Thennadil et al.

(10) Patent No.: US 11,475,405 B2
(45) Date of Patent: Oct. 18, 2022

(54) STORE-BASED ORDER FULFILLMENT SYSTEM

(71) Applicant: Target Brands, Inc., Minneapolis, MN (US)

(72) Inventors: Ramesh Thennadil, Minneapolis, MN (US); Bob Danielson, Minneapolis, MN (US); Harish Vempati, Minneapolis, MN (US); Kristofer Hjelmeland, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 82 days.

(21) Appl. No.: 16/689,395

(22) Filed: Nov. 20, 2019

(65) Prior Publication Data

US 2020/0160267 A1    May 21, 2020

Related U.S. Application Data

(60) Provisional application No. 62/769,865, filed on Nov. 20, 2018.

(51) Int. Cl.
*G06Q 10/08* (2012.01)
*G06Q 10/06* (2012.01)

(52) U.S. Cl.
CPC ..... *G06Q 10/0875* (2013.01); *G06Q 10/0633* (2013.01); *G06Q 10/063114* (2013.01); *G06Q 10/0836* (2013.01)

(58) Field of Classification Search
CPC ....... G06Q 10/0875; G06Q 10/063114; G06Q 10/0633; G06Q 10/0836
(Continued)

(56) References Cited

U.S. PATENT DOCUMENTS 7,117,825 B2    10/2006    Phillips
8,600,821 B2 *  12/2013    Borders ............... G06Q 10/101
                                                              705/26.1

(Continued)

OTHER PUBLICATIONS

Bell, D. R., Gallino, S., & Moreno, A. (2014). How to win in an omnichannel world. MIT Sloan Management Review, 56(1), 45-53. Retrieved from https://www.proquest.com/scholarly-journals/how-win-omnichannel-world/docview/1627694540/se-2 (Year: 2014).*

(Continued)

*Primary Examiner* — Charles Guiliano
*Assistant Examiner* — Thea Labogin
(74) *Attorney, Agent, or Firm* — Fish & Richardson P.C.

(57) ABSTRACT

A store fulfillment manager (SFM) system provides fulfillment of orders from inventory in a retail store. An ingestion layer ingests orders published by an order management system (OMS.) The OMS publishes the orders to the SFM system. A fulfillment database is used, into which the ingestion layer publishes the orders to be fulfilled from the retail store, the fulfillment database being dynamically updated to include the current orders that are available for processing and fulfillment. An SFM application programming interface (API) is configured to interface with multiple different store-based fulfillment systems. An internal workflow processor is configured to monitor the status of order fulfillment by the SFM and to publish status information to the OMS.

16 Claims, 7 Drawing Sheets

(58) Field of Classification Search
USPC .......................................................... 705/7.15
See application file for complete search history.

(56) References Cited

U.S. PATENT DOCUMENTS

| | | | |
|---|---|---|---|
| 8,626,333 B2 | 1/2014 | Waddington et al. | |
| 9,064,277 B2* | 6/2015 | Wong | G06Q 30/06 |
| 9,659,079 B2* | 5/2017 | Vasantham | G06Q 10/087 |
| 2007/0124216 A1* | 5/2007 | Lucas | G06Q 30/02 |
| | | | 705/26.1 |
| 2009/0112675 A1 | 4/2009 | Servais | |
| 2010/0138037 A1* | 6/2010 | Adelberg | G06Q 10/087 |
| | | | 700/241 |
| 2018/0253682 A1* | 9/2018 | Gilman | G06Q 10/087 |
| 2019/0259043 A1* | 8/2019 | Koneri | G06N 7/005 |
| 2019/0266536 A1* | 8/2019 | Halbrook | G06Q 10/06315 |
| 2020/0012983 A1* | 1/2020 | Wicker | G06Q 10/0875 |

OTHER PUBLICATIONS

Kuhn, Heinrich, Integrative retail logistics: An exploratory study, Feb. 2012 (Year: 2013).*
Wei-yu Kevin Chiang, George E. Monahan, Managing inventories in a two-echelon dual-channel supply chain, European Journal of Operational Research, vol. 162, Issue 2, 2005 pp. 325-341 (Year: 2005).*
[No Author Listed] IBM Knowledge Center—Batching, 1 page.
[No Author Listed] IBM Knowledge Center—Pick Strategy and Processes, 2 pages.

* cited by examiner

STORE-BASED ORDER FULFILLMENT SYSTEM

CROSS-REFERENCE TO RELATED APPLICATIONS

This application claims the benefit of U.S. Provisional Application Ser. No. 62/769,865, filed Nov. 20, 2018. The disclosure of the prior application is considered part of (and is incorporated by reference in) the disclosure of this application.

TECHNICAL FIELD

The present document generally relates to order fulfillment systems, including in-store order fulfillment systems.

BACKGROUND

The management and movement of goods has traditionally involved several different layers of management systems. For example, some systems have relied on an order management system (OMS) that processes orders, an inventory management system that tracks inventory, and a warehouse management system (WMS) that manages the fulfillment of orders in a warehouse. In such an example system, an order would come in to the OMS, which would then query the inventory management system to determine whether the order can be fulfilled and which warehouse, if there are multiple, will be able to fulfill it. The OMS can then release the order to the WMS for fulfillment by the identified warehouse. The WMS can receive the order and generate tasks for workers in the warehouse to perform in order to fulfill the order. Tasks can include things like a list of pick operations for different pallet locations in the warehouse and a loading dock door/truck into which the pallets are being placed. Once the tasks are done, the WMS can report back to the OMS that the order has been fulfilled and the order can be closed.

Order fulfillment systems have been used to transport goods from warehouses either directly to consumers or to retail stores. For example, order fulfillment systems have been used to fulfill direct consumer orders that are shipped from a warehouse directly to a consumer, such as in the situation of an online store that is fulfilling online orders. Order fulfillment systems have also been used to fulfill orders to retail stored, which are received from the warehouse and then stocked onto shelves for direct sales to consumers.

SUMMARY

This document generally describes store-based fulfillment of orders using store fulfillment managers (SFM) that address particular complexities associated with store-based order fulfillment. For example, traditional warehouse based fulfillment of orders does not have to compete with other demands on the supply of goods within the warehouse—the goods that are in the warehouse are available for shipping. In contrast, with store-based fulfillment, the supply of goods within a store-based fulfillment, the supply of goods is constantly in flux because they are on retail shelves that are being depleted by customers, and new supply is being added to replenish store shelves. Additionally, store-based fulfillment can include a variety of different options, including shipping from a retail store to a customer, courier-type delivery services (e.g., same day delivery options), and in-store pickup options. Accommodating all of these varied options as well as a supply that is in flux can create complexities that the disclosed SFMs are capable of solving. For example, as described throughout this document, SFMs can provide flexible architectures through which different delivery modules are able to interface, and can accommodate for possible fluctuations in supply over time.

In some implementations, a store fulfillment manager (SFM) system provides fulfillment of orders from inventory in a retail store. The system includes an ingestion layer to ingest orders published by an order management system (OMS) that is decoupled from the SFM. The OMS publishes the orders to the SFM system in response to determining that the retail store has sufficient current and future inventory to fulfill the orders as well as projected in-store purchases during an order fulfillment time period. The system further includes a fulfillment database into which the ingestion layer publishes the orders to be fulfilled from the retail store, the fulfillment database being dynamically updated to include the current orders that are available for processing and fulfillment. The system further includes an SFM application programming interface (API) that is configured to interface with multiple different store-based fulfillment systems that each fulfill orders and are decoupled from the SFM system. The system further includes an internal workflow processor that is configured to monitor the status of order fulfillment by the SFM and to publish status information to the OMS.

Implementations can include any, all, or none of the following features. The multiple different store-based fulfillment systems include a stored-based shipment system that is configured to pick, pack, and ship the orders to customers from the inventory within the retail store. The store-based shipment system includes a receive module that is configured to track inventory additions to the retail store from a warehouse management system (WMS). The store-based shipment system includes a pick module that is configured to generate pick tasks for workers to perform within the retail store to obtain the items included in an order from inventory within the retail store. The store-based shipment system includes a pack module that is configured to generate shipment tasks for workers to perform to ship items that have been picked using the pick module. The multiple different store-based fulfillment systems include a store pick-up system that is configured to pick, pack, and prepare for in-store pickup by customers at the retail store. The store pick-up system includes an in-store pick-up system that is configured to generate pick tasks for a worker to perform to collect the items in the orders and to prepare them for pick-up at one or more designated areas within the retail store. The store pick-up system includes a curbside pick-up system that is configured to generate pick tasks for a worker to perform to collect the items in the orders and to prepare them for delivery to a customer's vehicle at one or more designated areas outside or near the retail store.

In one aspect, a method is used for fulfillment of orders from inventory in a retail store. The method includes ingesting, by an ingestion layer, orders published by an order management system (OMS) that is decoupled from the SFM. The OMS publishes the orders to the SFM system in response to determining that the retail store has sufficient current and future inventory to fulfill the orders as well as projected in-store purchases during an order fulfillment time period. The method further includes receiving, by a fulfillment database, the orders to be fulfilled from the retail store, the fulfillment database being dynamically updated to include the current orders that are available for processing and fulfillment. The method further includes interfacing, by an SFM application programming interface (API,) with multiple different store-based fulfillment systems that each fulfill orders and are decoupled from the SFM system. The method further includes monitoring, by an internal workflow processor, the status of order fulfillment by the SFM and to publish status information to the OMS.

Implementations can include any, all, or none of the following features. The multiple different store-based fulfillment systems include a stored-based shipment system that is configured to pick, pack, and ship the orders to customers from the inventory within the retail store. The store-based shipment system includes a receive module that is configured to track inventory additions to the retail store from a warehouse management system (WMS). The store-based shipment system includes a pick module that is configured to generate pick tasks for workers to perform within the retail store to obtain the items included in an order from inventory within the retail store. The store-based shipment system includes a pack module that is configured to generate shipment tasks for workers to perform to ship items that have been picked using the pick module. The multiple different store-based fulfillment systems include a store pick-up system that is configured to pick, pack, and prepare for in-store pickup by customers at the retail store. The store pick-up system includes an in-store pick-up system that is configured to generate pick tasks for a worker to perform to collect the items in the orders and to prepare them for pick-up at one or more designated areas within the retail store. The store pick-up system includes a curbside pick-up system that is configured to generate pick tasks for a worker to perform to collect the items in the orders and to prepare them for delivery to a customer's vehicle at one or more designated areas outside or near the retail store.

The systems, devices, program products, and processes described throughout this document can, in some instances, provide one or more of the following advantages. For example, SFMs can permit stores to effectively operate as mini-distribution and order fulfillment centers, while at the same time accommodating for in-store demand. Treating a retail store, which is designed to have a primary purpose of direct sales to customers, as a distribution center can pose a variety of issues, like potentially depleting in-store supplies that would otherwise be available for customers and also having to rely on an inventory that is unpredictable.

For example, priority of inventory for goods within a retail store can be given to in-store customers who have made the trip to the store. As a result, inventory buffers and projections may be incorporated into the SFMs so as to ensure that sufficient inventory will remain in the store for in-store customers until the inventory is replenished.

In another example, the inventory within a store can fluctuate with less predictability than within a warehouse, where all shipments in and out of the warehouse are controlled by the WMS. Since customers shopping behavior can be variable (e.g., time when shoppers arrive at store, items they select, quantity they select), it can be more challenging to determine how much inventory is available within a store at a given point in time. For instance, a shopper may pick up all of the remaining inventory for a particular item (depleting the inventory in the store for that item) and walk around the store for a while before checking out. Since the sale of those items may not be registered by an SFM until the sale of those items is completed, it may appear that the store has more available inventory of that item than it actually does. An SFM attempting to fulfill an order for that item between when the shopper has physically depleted the inventory and subsequently when the inventory has been registered as depleted (when shopper checks-out), may run into a situation where an order is unable to be fulfilled even though the inventory appears in the system as being available. The SFMs described throughout this document can account for such scenarios and can provide for contingencies to ensure fulfillment of such orders when the expected inventory within a store is unavailable.

In another example, SFMs can be designed to be decoupled from other system components to provide for flexible interfacing with a variety of different components, including fulfillment modules and ordering modules. Instead of relying on more traditional system architectures requiring specific communication protocols between system components, SFMs can be designed to publish topics and make information available for access by any type of corresponding module. This can permit for new fulfillment modules that become available to readily be added to the system without reworking the entire system architecture. For example, a fulfillment module that manages the picking of items in an order for in-person pick-up at the store can readily be added to the system to fulfill orders made available through an SFM without having to rework the SFM's system architecture. Similarly, other order modules that make orders available to the SFM can also be readily incorporated into the SFM architecture without making system modifications. This can permit for the SFM to be flexible and dynamically adapted over time.

Other features, aspects and potential advantages will be apparent from the accompanying description and figures.

DESCRIPTION OF DRAWINGS

Like reference symbols in the various drawings indicate like elements

DETAILED DESCRIPTION

Figure 1:
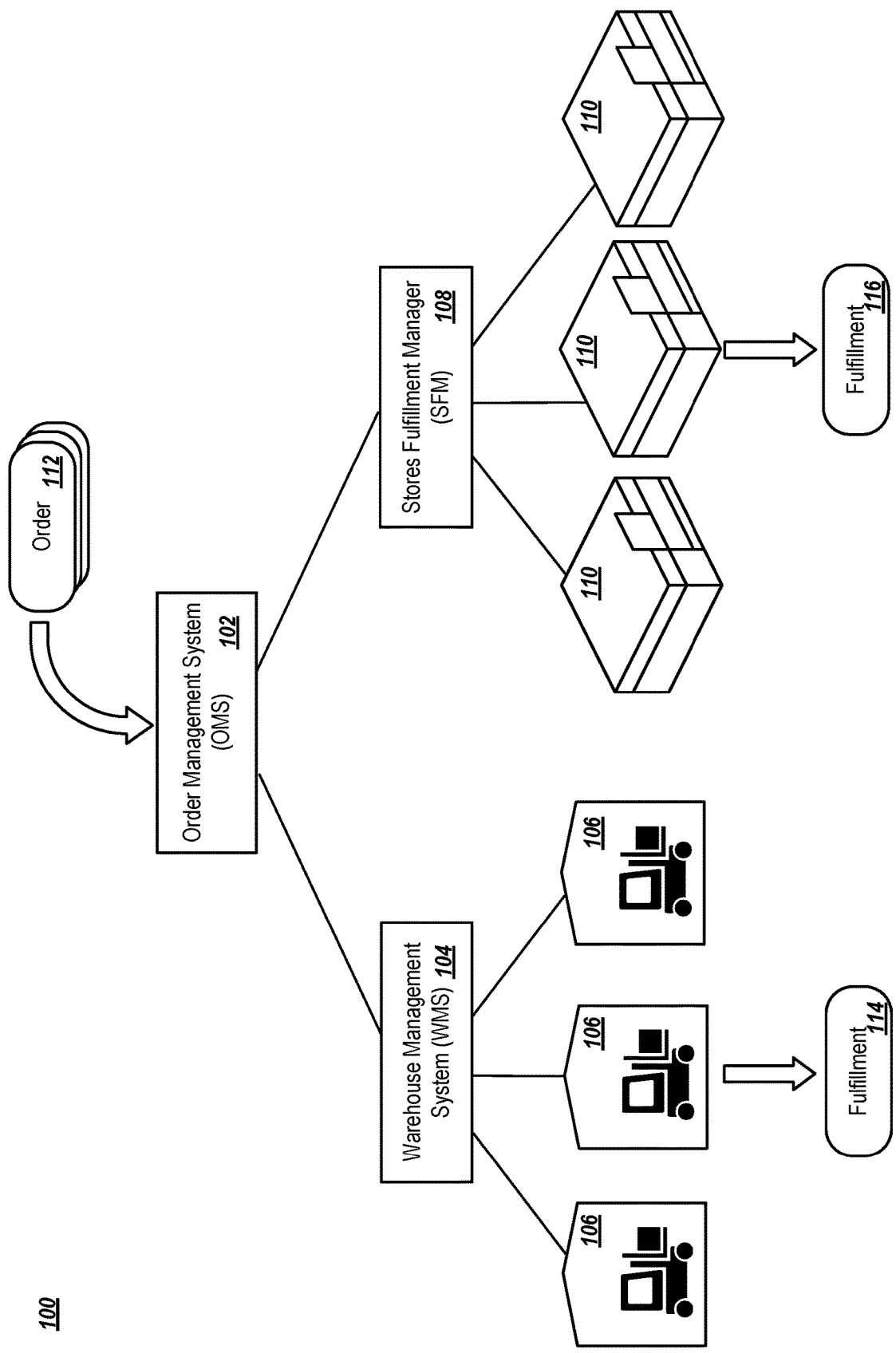
FIG. 1 in a conceptual diagram of an example system for fulfilling orders.

This document generally describes SFMs to fulfill orders from retail stores, which are physical locations that are designed primarily to service in-store customers who show up and purchase goods generally without schedules or advance notice. SFMs can be configured to fulfill orders across multiple different order fulfillment systems in a manner that is decoupled from other systems, including an order management system (OMS), a warehousing management system (WMS), and order fulfillment systems (e.g., picking and shipping from a store, in-store pickup by consumers, drive-up pickup by consumers). The SFM system can be designed accomplish this decoupling from the other systems that are used to fulfill orders, such as the OMS and the WMS, by using a publication scheme among the systems instead of an interconnected architecture of systems directing each other to perform operations. For example, the SFM can poll the OMS for orders that are available and can poll the WMS for warehousing information, such as available inventory at various warehouses. The OMS and the WMS can publish this information instead of transmitting this information to the SFM in the form of instructions. Similarly, the SFM can use this obtained information to determine when and what pick tasks are ready to be performed, which can similarly be published and accessed by one or more of multiple different order fulfillment systems. These order fulfillment systems can poll the SFM for available pick tasks and, when one is available, can perform their specific set of operations to fulfill the pick task. Each of the different order fulfillment systems can perform different operations and can have different modes of delivery for order fulfillment, such as shipping, in-store pick, curbside pickup, etc.

The decoupling of the SFM from the other systems used to process and fulfill orders can provide a variety of different benefits. In particular, decoupling these systems can provide independence among them—meaning that they are not dependent on the operation, protocols, or framework of each other. This permits for each of the system components, including the SFM, the order fulfillment systems, the OMS, and the WMS, to readily be modified, updated, and replaced independent of the other system components. Dependence among complicated system components can otherwise be a significant barrier to performing updates and modifications, particular with systems handling large scale operations. By making each of these components modular and independent, separate operations and updates can be performed on each, which can make management of the system easier and less complicated.

In another example, independence provided by decoupling these components can also permit for them to be readily scaled, such as in a cloud-based system. Scaling can be a significant concern, particularly when spikes in volume can occur, such as during holiday shopping. By permitting ready and independent scaling among the components, the system can more appropriately, quickly, and accurately respond to variations in system requirements. This can decrease latency and improve resource efficiency, as well.

SFMs can provide in-store fulfillment by, for example, generating pick tasks that are decoupled from specific fulfillment systems. In conventional systems, the system generating pick tasks is coupled to specific order fulfillment systems, such as through a dependence between the systems. The SFM can accomplish this by determining and publishing available pick tasks.

SFMs can also provide in-store fulfillment of orders by, for example, being decoupled from the OMS and the WMS in a manner that permits the SFM to be independent of both of these components. In conventional systems, the SFM would depend from one or both of those systems. In contrast, the SFM polls the OMS and the WMS for available information, which it then uses to perform its operations without relying on instructions from either of those components.

FIG. 1 in a conceptual diagram of an example system 100 for fulfilling orders. The example system 100 includes an OMS 102 that manages incoming orders 112. The orders 112 can originate from any of a variety of sources, such as online orders placed at an online store, mobile orders placed from mobile applications, internal orders placed by the internal system (e.g., orders to replenish goods at a store), and/or other orders.

The OMS 102 is configured to manage the fulfillment of the orders 112. In the example system 102, the orders 112 can be fulfilled by one or more WMS systems 104, which can each manage one or more physical warehouses 106. For example, each of the warehouses 106 can have a corresponding WMS 104, or multiple warehouses 106 can be managed by a single WMS 104. The WMS 104 can translate the orders 112 into tasks that are performed within the warehouses 106 to fulfill the orders 112. Fulfillment 114 of the orders 112 by the WMS 104 and the warehouses 106 can include, for example, shipment of the ordered goods via one or more carriers, such as delivery trucks, mail services, shipping services, and/or other warehouse-based delivery methods.

The OMS 102 is also configured to direct the fulfillment of the orders 112 via the SFM 108, which can manage the fulfillment of orders via one or more retail stores 110. Similar to the WMS 104, the SFM 108 can manage one of the retail stores 110, or can manage multiple retail stores 110. Also similar to the WMS 104, the SFM 108 can translate the orders 112 into tasks that are available to be performed by one or more fulfillment systems that are used to fulfill the orders 112, resulting in the store-based fulfillment 116. For example, the SFM 108 can interface with multiple different fulfillment systems, such as systems that provide for store-based shipment of goods out of the retail stores 110, picking of goods from within a store 110 for customer pickup, picking of goods from within a store 110 for customer drive-up, and/or other fulfillment systems.

The SFM 108 can be decoupled from the OMS, the WMS 104, and the in-store fulfillment systems that generate the fulfillment 116 of the orders from the stores 110. Such decoupling can provide any of a variety of advantages, such as permitting the SFM 108 to be updated, modified, replaced, and/or changed without having to also change the corresponding other systems, such as the OMS 102, the WMS 104, and the in-store fulfillment systems. Similarly, decoupling the SFM 108 can permit for these other systems to also be updated, modified, replaced, and/or changed without also having to perform the same modifications to the SFM 108. For example, in-store fulfillment systems can be readily added, replaced, and/or modified without also having to make the same changes to the SFM 108.

The OMS 102 is configured to route the orders 112 to either to a WMS 104 or to the SFM 108 for fulfillment based on any of a variety of factors. For example, orders 112 that are placed and specify in-store pickup may be routed to a corresponding SFM 104 for the selected store unless, for example, the corresponding retail store 110 does not have the inventory to fulfill the order, in which case it may be fulfilled by another store 110 and/or by the WMS 104. In another example, when determining whether to select the SFM 108, the OMS 102 can evaluate the current level of inventory within a retail store 110, projected sales of those items for the retail store 110, and currently scheduled replenishment of those items in the retail store 110 from the warehouses 106 via the WMS 104 to determine whether fulfillment with the SFM 108 is possible without overly-depleting the inventory from the store 110. If it is determined that applying the current inventory within the store 110 to fulfill the order 112 will leave at least a minimum amount of inventory in the store 110 (e.g., inventory to cover projected sales plus inventory buffer), then the OMS 102 can route the order 112 to the SFM 108 for fulfillment. If the order 112 cannot be fulfilled without leaving the store 110 below a determined threshold level of inventory for the store 110, then the OMS 102 can route the order 112 to the WMS 104 for fulfillment. Other scenarios, decision logic, and factors that can be evaluated by the OMS 102 to route orders 112 between the WMS 104 and the SFM 108 are also possible.

Figure 2A:
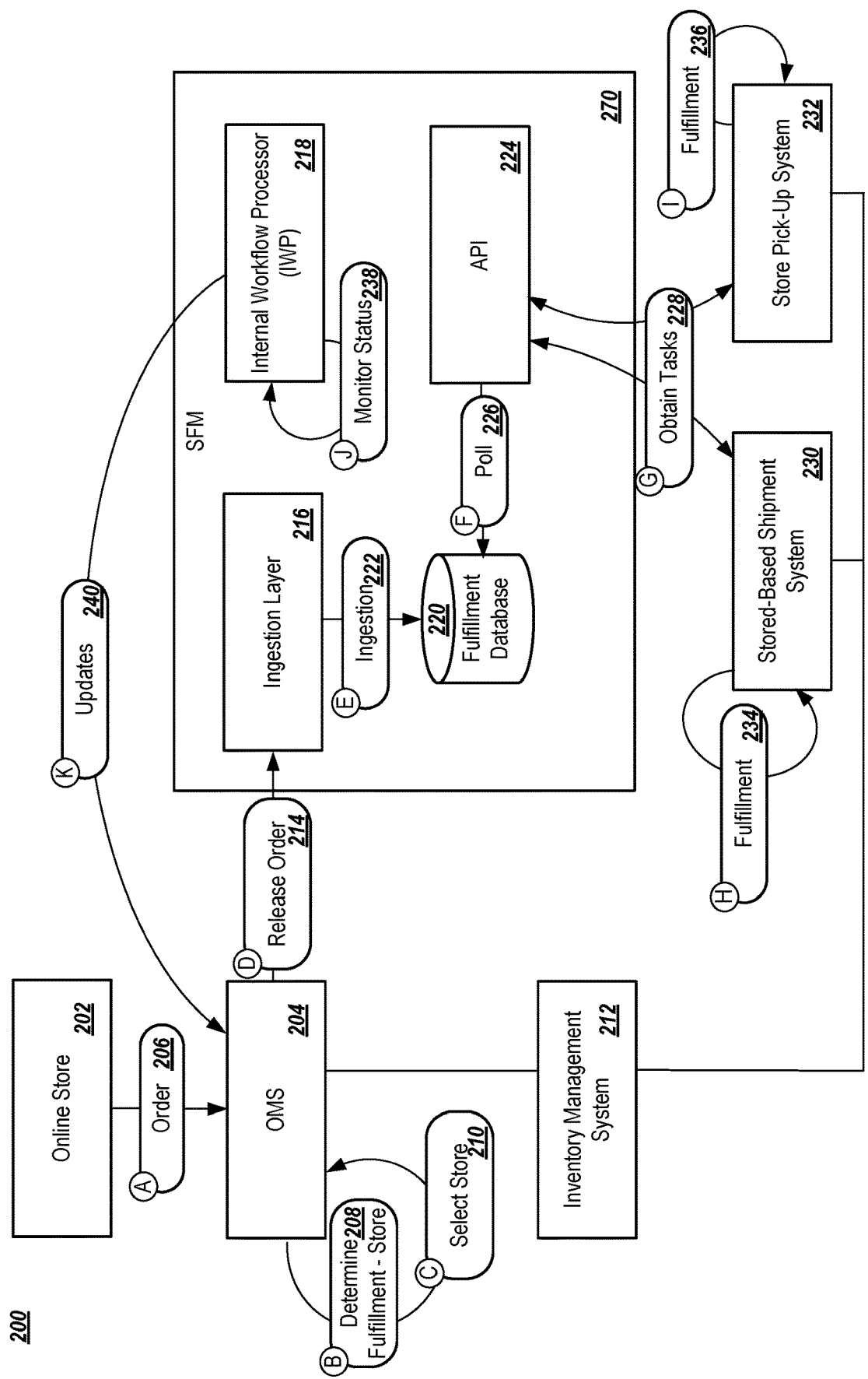
FIGS. 2A-B depict an example system for fulfillment of orders via a retail store.
Figure 2B:
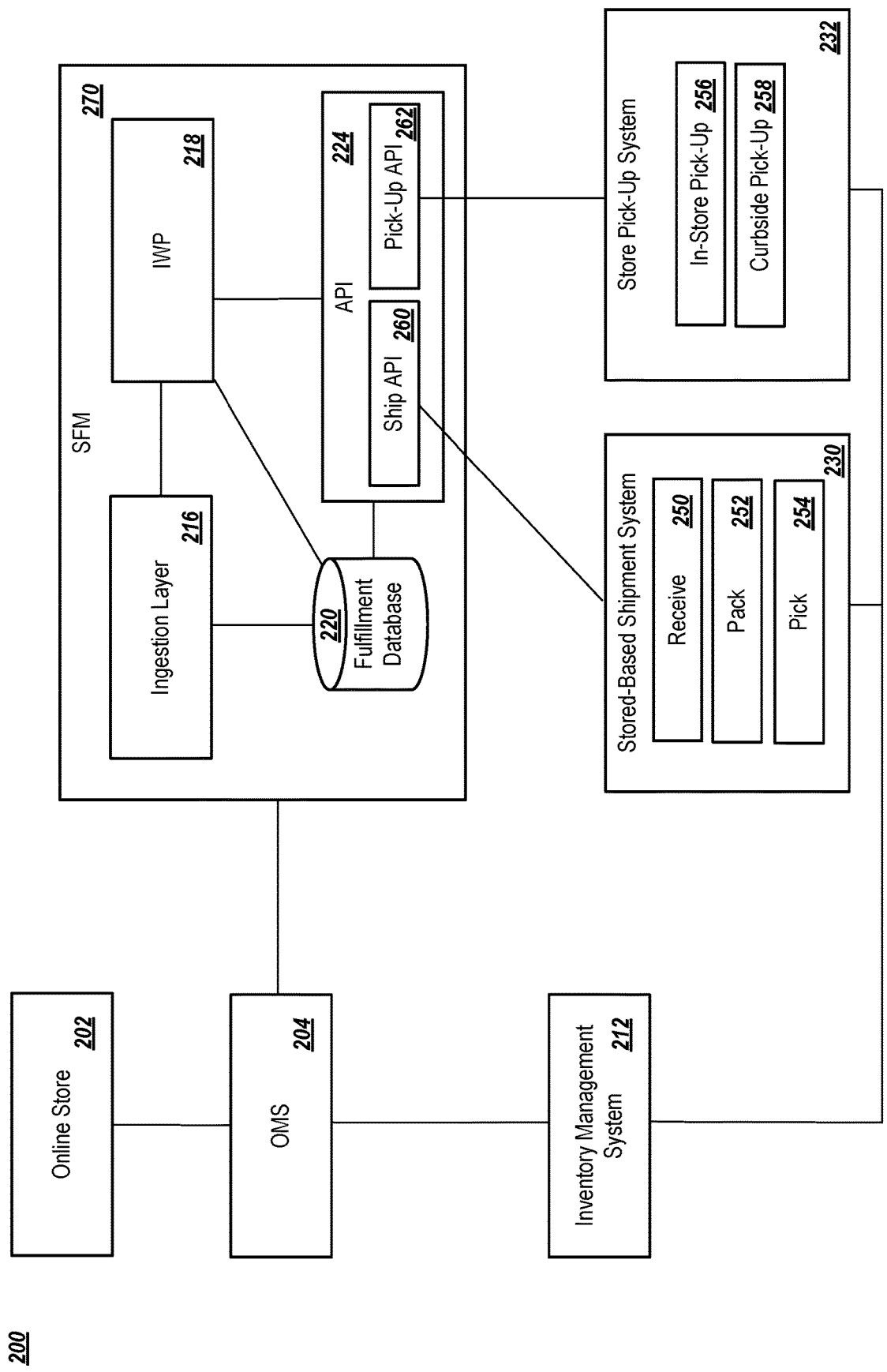

FIGS. 2A-B depict an example system 200 for fulfillment of orders via a retail store. The example system 200 includes an example online store 202 that can generate orders managed by an OMS 204, which can interface with an SFM 270 to fulfill orders in a retail store. The online store 202 is an example source of orders that are provided to the OMS 204, similar to the orders 112 described above. The OMS 204 can be similar to the OMS 102, and the SFM 270 can be similar to the SFM 108.

Referring to FIG. 2A, an example process flow is depicted showing an example process for fulfilling orders with the SFM 270. As shown in step A (206), an order is transmitted from the online store 202 to the OMS 204. In response to receiving the order, the OMS 204 can determine whether fulfillment by a retail store is possible, as indicated by step B (208). Such a determination by the OMS 204 can evaluate a variety of factors, such as the order requirements (e.g., items included in order, quantity of items, timeframe for fulfillment), current inventory for the store (e.g., items at the store, quantity of items at store), projected sales of items in the store during fulfillment period (e.g., quantity of items projected to be sold by store during period of fulfillment, confidence in projected sales figure, previous accuracy of projections, historical variation from projection), buffer level for projected sales (e.g., buffer to account for variation), scheduled replenishment of goods at store (e.g., currently scheduled delivery of additional inventory at store), the type of order and delivery method (e.g., in-store pickup, mail shipment, drive-up), and/or other factors. Such a determination can be made by accessing one or more other data sources, such as an inventory management system 212 that manages and tracks the inventory in retail stores, and in some instances the inventory in one or more warehouses as well. As noted above, the OMS 204 may limit fulfillment by the SFM 270 to instances where the order can be fulfilled without draining the inventory available in the store for projected sales during the fulfillment period.

Once a determination is made that the order can be fulfilled by a retail store, the OMS can select a store for fulfillment, as indicated by step C (210). The store selection can be based on any of a variety of factors, such as the type of order and delivery method (e.g., in-store pickup, mail shipment, drive-up), store location (e.g., city, state, zip code, GPS coordinates, street address), location where fulfillment will be completed (e.g., location where pick-up will occur, delivery address), and/or other factors. For example, a store that is designated as the pick-up location can be selected unless, for example, the store does not have the appropriate inventory level to fulfill the order. In another example, a store that has a sufficient amount of inventory to fulfill the order and that is located closest to the delivery address can be selected. Such a selection technique can provide a variety of advantages, including minimizing delivery and fulfillment time for orders (e.g., instead of shipping from a remote warehouse, inventory from retail stores that are closer to the delivery address can be selected).

Once the store has been selected, the order can be released to an SFM 270 that corresponds to and manages store-based fulfillment of orders for that store, as indicated by step D (214). The SFM 270 includes an ingestion layer 216 that processes and ingests orders that are being released to the SFM 270, as indicated by step E (222). Once an order is released by the OMS 204, the SFM 270 can assume responsibility for fulfilling the order. The ingestion layer 216 can generate one or more pick tasks that are to be performed to fulfill the order. Pick tasks are tasks that are performed to pick items from inventory to fulfill the order. The ingested order can be added to a fulfillment database 220 that is dynamically updated with currently available orders and tasks that to be fulfilled for the SFM 270.

The orders and tasks in the fulfillment database 220 can be published and made available through an API 224 within the SFM 270, through which one or more decoupled fulfillment systems can poll for available orders and tasks, as indicated by step F (226). Example fulfillment systems include, for example, a stored-based shipment system 230 that can ship items from a retail store to a customer. Shipment can include, for example, courier services, mail shipment, expedited shipping, and/or other methods for delivering items to a customer. Another example fulfilment system is a store pick-up system 232 that can pick and group items for an order in advance of a customer arriving at a store to pick-up the items. As indicated by step G (228), the tasks for an order can be obtained by the store-based shipment system 230 and the store pick-up system 232 via the API 224. Once the tasks have been obtained, the store-based shipment system 230 can proceed to fulfill the order, as indicated by step H (234). Similarly, once the tasks have been obtained, the store pick-up system 232 can proceed to fulfill the order, as indicated by step I (236). The fulfillment systems 230-232 can be decoupled from the SFM 270 based on the publication of tasks and orders through the fulfillment database 220 and the API 224, which can permit additional and/or alternative fulfillment systems to be used in combination with the SFM 270. For example, another fulfillment system, such as a drone-based fulfillment system, can readily be incorporated into and used to fulfill the orders with the SFM 270.

The SFM 270 can also include an internal workflow processor (IWP) 218 that monitors the status of store-based order fulfillment, as indicated by step J (238). Monitoring the status can include, for example, polling the fulfillment systems 230-232 for progress on fulfillment, and/or polling the fulfillment database 220 for status information. Given that the inventory within a physical retail store can be variable and unpredictable, the IWP 218 can monitor for whether fulfillment is able to be completed by a retail store and, when fulfillment is not possible within a given timeframe, the IWP 218 can report back to the OMS 204, as indicated by step K (240). For example, the IWP 218 may automatically determine that the order is unable to be fulfilled by a retail store if the order is not fulfilled within a threshold period of time (e.g., 1 hour, 2 hours, 6 hours, 12 hours, 1 day, 2 days). Additional and/or alternative techniques for the IWP 218 to determine whether fulfillment is possible and successful are also possible.

Referring to FIG. 2B, additional details for the example API 224 and the example fulfillment systems 230-232 of the system 200 are depicted. In this example, the API 224 can include an in-store shipping API component 260 and an in-store pick-up API component 262 that are configured to interface with the store-based shipment system 230 and the store pick-up system 232, respectively. The store-based shipment system 230 can include a receive module 250 that is configured to receive shipments from warehouses, such as from the warehouses 106 and the WMS 104. The store-based shipment system 230 can also include a pack module 252 that is configured to package and ship orders from the store, and a pick module 254 that is configured to pick items from the store for shipping by the pack module 252. Each of the modules 250-252 can determine specific operations that are to be performed by workers, including identifying specific tasks, locations where the tasks are to be performed, and materials that are used to perform them. The modules 250-252 can each interface with one or more worker interface devices, such as handheld devices that present information on tasks to be performed and provide an interface through which the worker can acknowledge completion of the tasks.

The store pick-up system 232 can also include several modules, including an in-store pickup module 256 that is configured to direct workers to pick items included in an order, group the items, and prepare them for pick-up by a customer in a designated area of the store. The store pick-up system 232 can also include a curbside pick-up module 258 that is configured to direct workers to perform similar tasks as with the in-store pickup module 256, but can additionally direct workers on delivery of the order to a customer's vehicle when they arrive at one or more designated spots at or near the retail store. The modules 256-258 can also determine tasks that are to be performed, locations where they are to be performed, and materials to be used to fulfill the tasks. The modules 256-258 can also interface with worker devices (e.g., handheld devices) to direct workers on tasks to perform in order to fulfill orders.

Additional and/or alternative configurations of the system 200 and its components are also possible. For example, additional and/or alternative fulfillment systems are also possible, as well as additional and/or alternative components within the depicted fulfillment systems 230-232.

Figure 3:
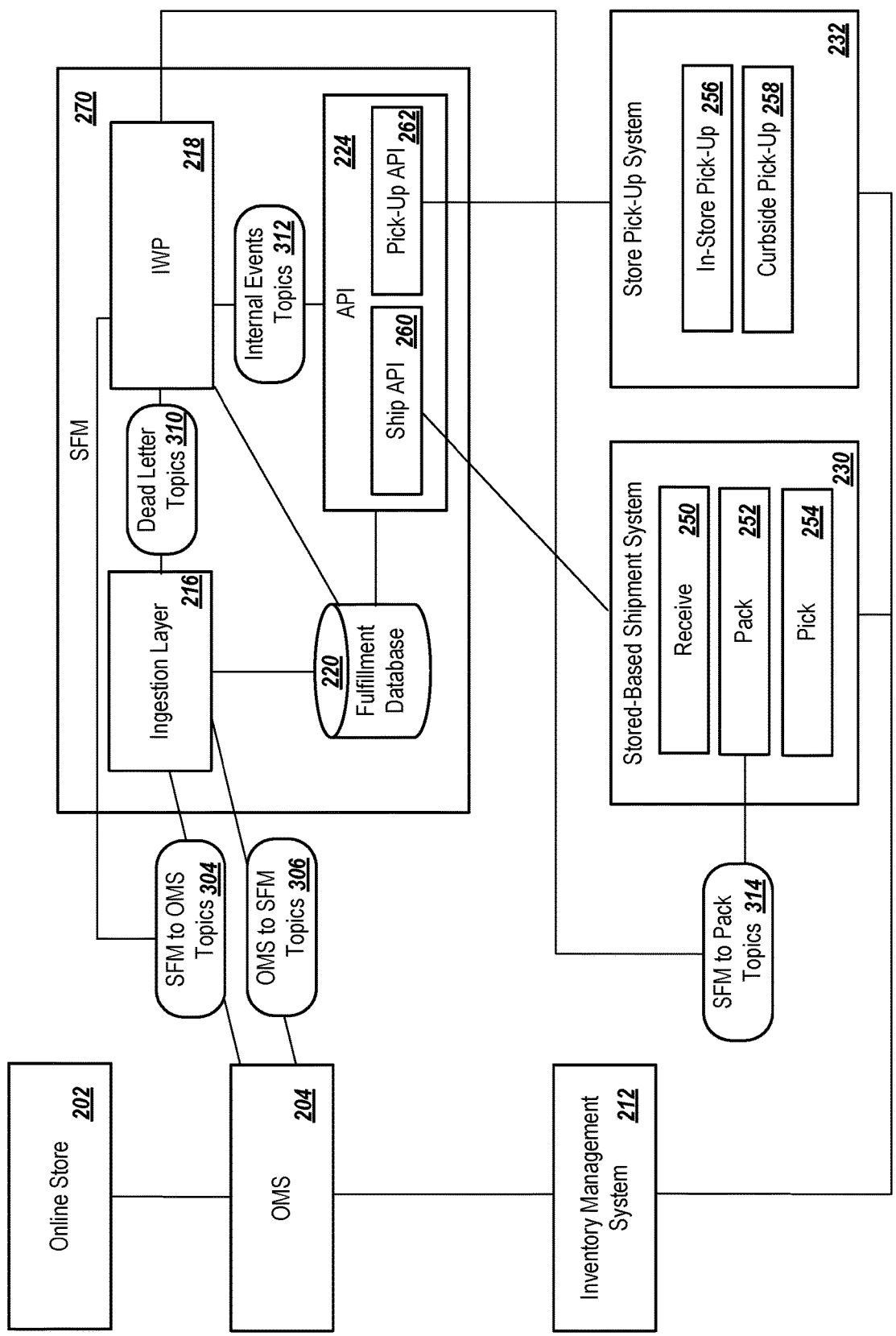
FIG. 3 depicts an example system with decoupled components for fulfillment of orders via a retail store.

FIG. 3 depicts an example system 300 with decoupled components for fulfillment of orders via a retail store. The example system 300 includes the same components as the system 200 as depicted above with regard to FIG. 2. The example system 300 adds topic publication services among several of the components to permit for publication of relevant information between components without requiring a client-server framework. Instead, the topic publication can permit for the components to be decoupled and independent from each other.

For example, the OMS 204 can publish topics 306 to the SFM 270, as shown by the topic publication pipeline 306. Similarly, the SFM 270 can public topics 304 to the OMS 204, as shown by the topic publication pipeline 304. Such publication can permit for information to be made available between the OMS 204 and the SFM 270 without requiring direct communication, such as a more traditional client-server communication in which there are lower level messaging protocols that are shared, including message acknowledgements.

Similarly, internal components within the SFM 270 can publish topics instead of directly transmitting information to each other. For example, the ingestion layer 216 and the IWP 218 can publish information to a dead letter topics pipeline 310, which can include information that can be used to track whether an order is able to be fulfilled. The IWP 218 and the API 224 can publish information to an internal events topics pipeline 312, which can include information regarding the status of orders and their fulfillment. The IWP 218 can monitor both of these pipelines 310-312 in order to determine the status of the order and to provide updates to the OMS 204, which can be published to the pipeline 304.

The IWP 218 can also publish information to one or more of the fulfillment systems. For example, the IWP 218 can publish information to the pack module 252 of the store-based shipping system 230 via the pipeline 314. Such information can include, for example, information on the current status of items within the store, their locations, and their current quantity.

The pipelines 304-314 can be made available between the components of the system 300 using any of a variety of appropriate techniques and systems, such as Kafka topic streams that can be published between components.

Figure 4:
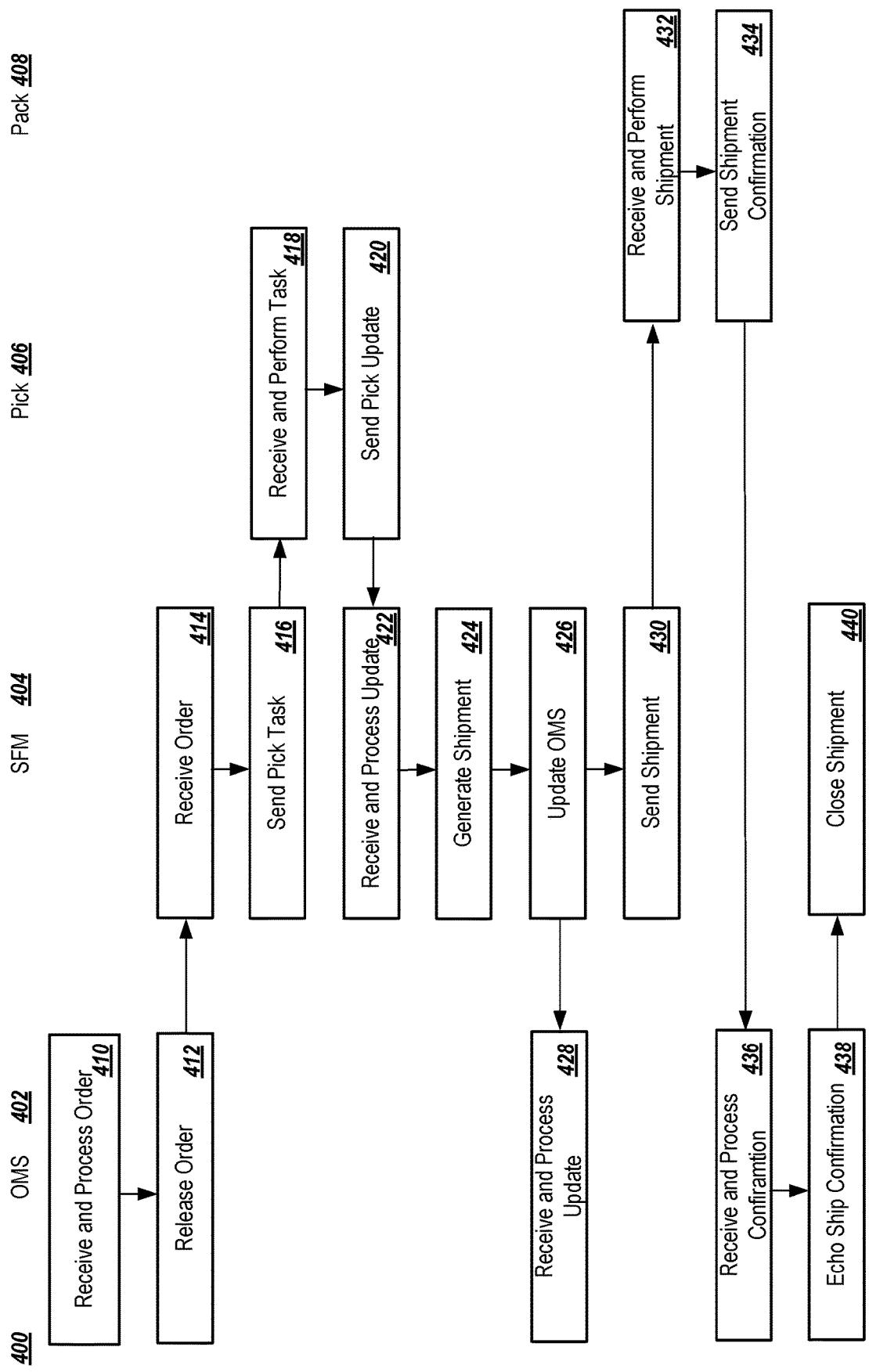
FIG. 4 is a flowchart of an example technique for performing a store-based shipment using decoupled components.

FIG. 4 is a flowchart of an example technique 400 for performing a store-based shipment using decoupled components. The example technique 400 is performed by an example OMS 402, an example SFM 404, and example fulfillment system components, including a pick module 406 and pack module 408. The OMS 402 can be similar to the OMS 102 and the OMS 204. The SFM 404 can be similar to the SFM 108 and the SFM 270. The fulfillment components 406 and 408 can be similar to the components 252 and 254, respectively.

An order is received and processed by the OMS 402 (410) and, once a determination is made that it should be routed to the SFM 404 for fulfillment, it is released (412). The SFM 404 can receive the order (414) and publish pick tasks for the order (416). The pick module 406 can poll the API for the task and, once obtained, can perform the task (418). Once the picking for the order has been completed, the pick module 406 can publish an update that the pick task has been completed (420). The SFM 404 can receive and process the update (422), which can prompt the SFM to generate and publish a shipment task (424, 430). Contemporaneously, the SFM 404 can update the OMS 402 (426) by publishing the status to the SFM to OMS topic. The OMS 402 can receive and process the update (428).

The pick module 408 can poll for tasks via an API, and can obtain and preform the shipment task (432). Once the shipment has been performed, the pack module 408 can publish a shipping confirmation (434), which can be received and processed by the OMS 402 (436). The OMS 402 can echo or retransmit the shipping confirmation (438), which can be obtained by the SFM 404 and used to close the shipment task (440).

Figure 5:
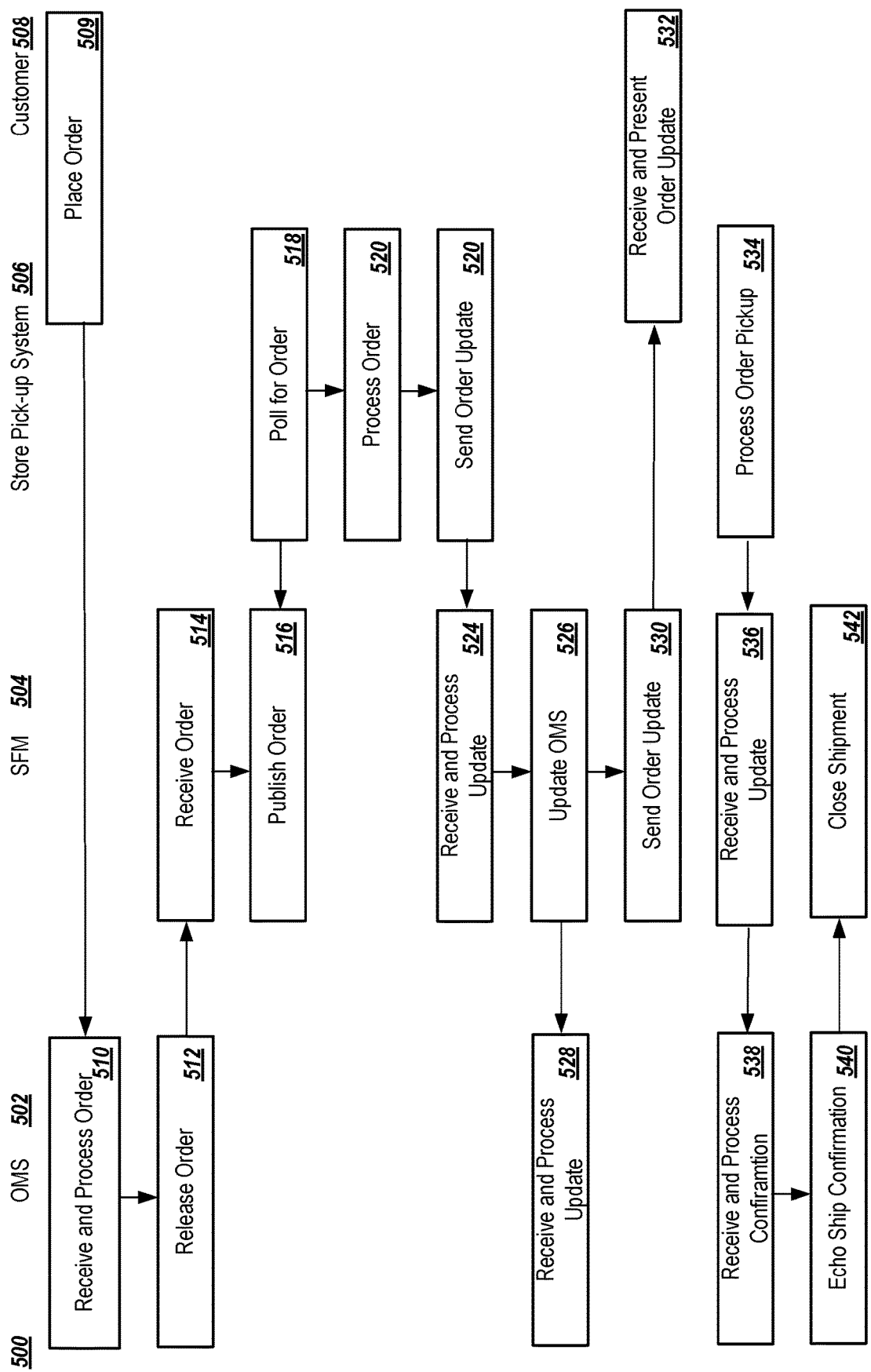
FIG. 5 is a flowchart of an example technique for performing a store-based pickup using decoupled components.

FIG. 5 is a flowchart of an example technique 500 for performing a store-based pickup using decoupled components. The example technique 500 is performed by an example OMS 502, an example SFM 504, an example fulfillment system components, including a store pickup system 506, and by an example customer 508. The OMS 502 can be similar to the OMS 102, the OMS 204, and the OMS 402. The SFM 504 can be similar to the SFM 108, the SFM 270, and the SFM 504. The fulfillment component 508 can be similar to the fulfillment system 232 and its components 256 and 258.

The customer 508 can place an order (509), such as through an online store and/or via a mobile application on the customer's mobile device. The OMS 502 can receive and process the order (510) and, in response to determining that it is appropriate for fulfillment by the SFM 504, can release the order to the SFM 504 (512). The SFM 504 can receive the order which has been published to the SFM 504 (514) and can proceed to publish the order for fulfillment by the system 506 (516). The system 506 can poll for and obtain the order (518), and can then proceed to process the order (520). For example, the system 506 can direct a worker to pick the items included in the order and to place them in a location of the store where they will be picked-up by the customer 508 or eventually delivered to the customer when they arrive at the store. An update on the status of the picking can be published by the system 506 (520), and received and processed by the SFM 504 (524). The SFM 504 can publish an update (526), which the OMS 502 can receive and process (528). The SFM 504 can additionally transmit an order update to the customer 508 (530), which can be received on the customer's device and can notify the customer that the order is available for pickup (532).

Once the customer 508 arrives at the store, which may be determined by the customer's device automatically generating a notification (e.g., geofenced notification generated when customer approaches store) and/or by the customer checking at the store. The system 506 can process the order pickup (534), which may include handing the items to the customer 508 and/or delivering the items to the customer's vehicle. The system 506 can publish confirmation that the order pickup has been completed (534), which the SFM 504 can receive and process (536) and relay to the OMS 502. The OMS and receive and process the confirmation (538), which can echo the shipment confirmation (540) and then permit the SFM 504 to close the shipment (542).

Figure 6:
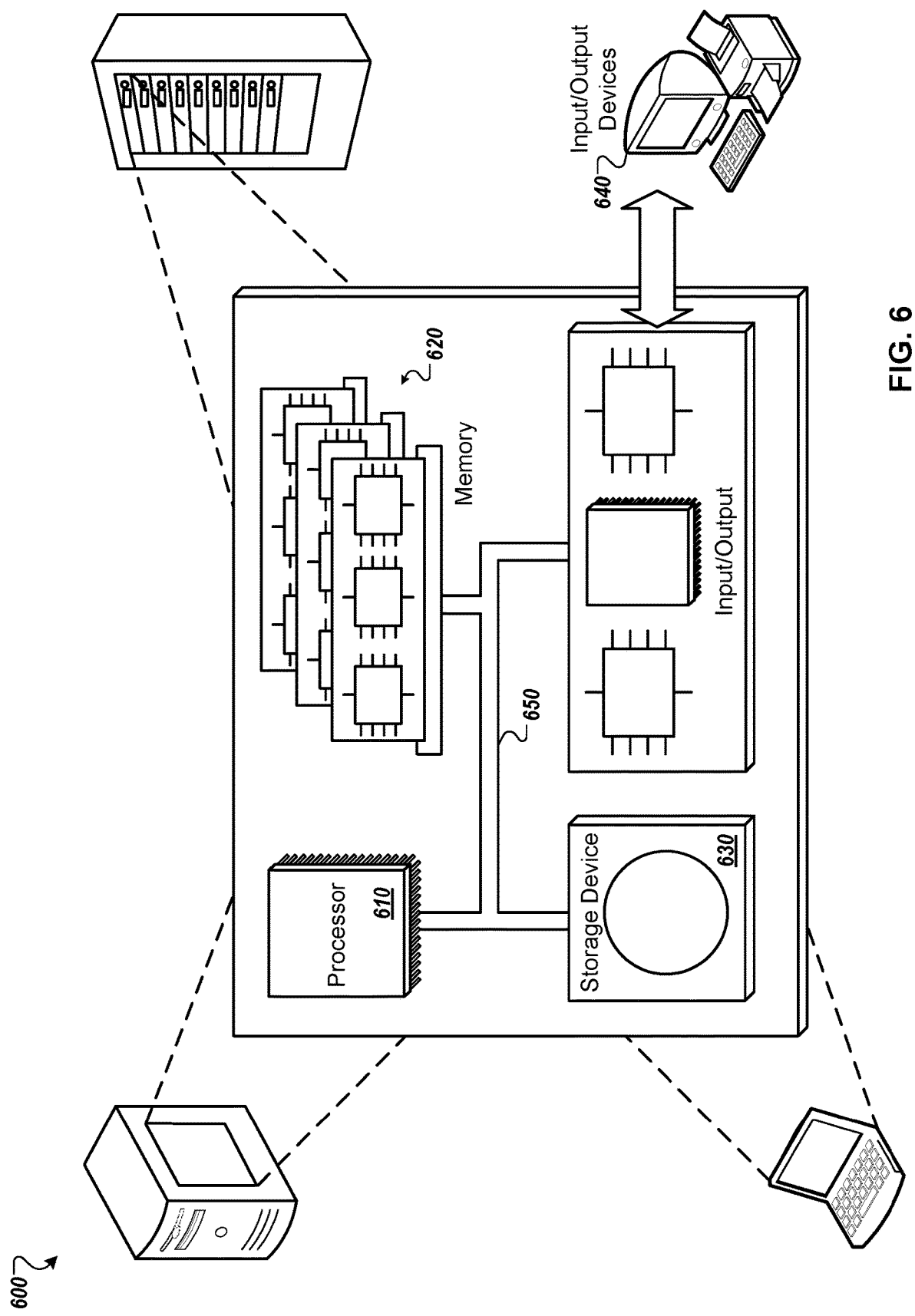
FIG. 6 is a schematic diagram that shows an example of a computing device and a mobile computing device.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system providing fulfillment of orders from inventory collectively held in a retail store and a warehouse, the system comprising:
   a store fulfillment manager (SFM) system that manages store-based fulfillment of orders from retail inventory contained in a retail store;
   a warehouse management system (WMS) that manages warehouse-based fulfillment of orders using warehouse inventory contained in a warehouse, wherein the WMS is decoupled from the SFM;
   an order management system (OMS) that is decoupled from the SFM such that the OMS is independent and separate from the SFM and from the WMS, wherein the OMS includes computer-readable medium storing instructions that, when executed by one or more processors, is configured to:
receive orders for items existing in inventory, wherein an order is to be initially fulfilled from retail inventory contained in the retail store and secondarily fulfilled from warehouse inventory in a warehouse, wherein the retail inventory and the warehouse inventory are both part of the inventory for the items;
determine whether the retail store has sufficient current and future retail inventory to fulfill (i) the order from the received orders as well as (ii) projected in-store purchases during an order fulfillment time period;
publish the order to a pipeline of the SFM, using an application programming interface (API), in response to determining that the retail store has sufficient current and future retail inventory to fulfill the order and the projected in-store purchases during the order fulfillment time period, wherein publishing the order comprises updating a fulfillment database to include the order that is available for processing and fulfillment instead of transferring information about the order to the SFM, wherein publishing the order to the pipeline permits for the order to be made available between the OMS and the SFM without requiring direct communication that includes one or more messaging protocols and message acknowledgements between the OMS and the SFM; and
transmit the order to the WMS to be fulfilled using the warehouse inventory in response to determining that the retail store has insufficient current and future retail inventory to fulfill the order and the projected in-store purchases during the order fulfillment time period;
wherein the SFM includes computer-readable medium storing instructions that, when executed by one or more processors, is configured to provide:
the pipeline for publishing information in topics instead of directly transmitting the information between components of the SFM and between decoupled components of the system, wherein the pipeline is at least one of a dead letter topics pipeline and an internal events topics pipeline;
an ingestion layer to ingest the order published by the OMS to the pipeline of the SFM, wherein the ingestion layer is configured to generate tasks to be performed to fulfill the order, the generated tasks being (i) decoupled from a specific store-based fulfillment system and (ii) published, by the ingestion layer, to the pipeline;
the fulfillment database into which the ingestion layer publishes the order to be fulfilled from the retail inventory contained in the retail store, the fulfillment database being dynamically updated, by the OMS, to include current orders that are available for processing and fulfillment from the retail inventory;
an SFM API that interfaces with multiple different store-based fulfillment systems that each fulfill orders and are decoupled from the SFM, wherein the SFM API includes multiple different store-based fulfillment API components that interface with each of the multiple different store-based fulfillment systems, wherein the multiple different store-based fulfillment systems include computer-readable medium storing instructions that, when executed by one or more processors, are configured to (i) poll the respective store-based fulfillment API components for tasks for the current orders, (ii) obtain the tasks for the current orders that are published by the fulfillment database via the SFM API to the pipeline and the store-based fulfillment API components, (iii) attempt to fulfill the current orders based on performing the obtained tasks, and (iv) report fulfillment status information via the respective store-based fulfillment API components indicating whether the tasks were able to be completed based on current retail inventory; and
an internal workflow processor that monitors the pipeline for status of order fulfillment by the SFM and publishes status information to the OMS via the pipeline based on polling the multiple different store-based fulfillment systems for updates on performing the obtained tasks to fulfill the current orders via the SFM API and the store-based fulfillment API components, wherein the internal workflow processor further determines whether the retail store has sufficient retail inventory to fulfill the current orders within a predetermined timeframe, and wherein the internal workflow processor further closes a current order based on one or more of the multiple different store-based fulfillment systems publishing an order completion status for the current order via the store-based fulfillment API components and, in response to closing the current order, transmits confirmation that the current order has been closed to the OMS via the pipeline of the SFM and the SFM API.

2. The system of claim 1, wherein the multiple different store-based fulfillment systems include a stored-based shipment system that includes computer-readable medium storing instructions that, when executed by one or more processors, is configured to pick, pack, and ship the orders to customers from the retail inventory contained in the retail store.

3. The system of claim 2, wherein the store-based shipment system includes a receive module that includes computer-readable medium storing instructions that, when executed by one or more processors, is configured to track inventory additions to the retail inventory contained in the retail store from the WMS.

4. The system of claim 2, wherein the store-based shipment system includes a pick module that includes computer-readable medium storing instructions that, when executed by one or more processors, is configured to generate pick tasks for workers to perform within the retail store to obtain the items included in an order from the retail inventory contained in the retail store.

5. The system of claim 2, wherein the store-based shipment system includes a pack module that includes computer-readable medium storing instructions that, when executed by one or more processors, is configured to generate shipment tasks for workers to perform to ship items that have been picked using the pick module.

6. The system of claim 1, wherein the multiple different store-based fulfillment systems include a store pick-up system that includes computer-readable medium storing instructions that, when executed by one or more processors, is configured to pick, pack, and prepare for in-store pickup by customers at the retail store.

7. The system of claim 6, wherein the store pick-up system includes an in-store pick-up system that includes computer-readable medium storing instructions that, when executed by one or more processors, is configured to generate pick tasks for a worker to perform to collect the items in the orders and to prepare them for pick-up at one or more designated areas within the retail store.

8. The system of claim 6, wherein the store pick-up system includes a curbside pick-up system that includes computer-readable medium storing instructions that, when executed by one or more processors, is configured to generate pick tasks for a worker to perform to collect the items in the orders and to prepare them for delivery to a customer's vehicle at one or more designated areas outside or near the retail store.

9. A method for fulfillment of orders from inventory collectively held in a retail store and a warehouse, the method comprising:
ingesting, by an ingestion layer, orders published by an order management system (OMS) to a pipeline of a store fulfillment manager (SFM) system that manages store-based fulfillment of orders from retail inventory contained in a retail store, wherein the OMS is independent, decoupled, and separate from the SFM and from a warehouse management system (WMS) that manages warehouse-based fulfillment of orders using warehouse inventory contained in a warehouse and is decoupled from the SFM, wherein the pipeline publishes information in topics instead of directly transmitting the information between components of the SFM and between the decoupled OMS, the pipeline being at least one of a dead letter topics pipeline and an internal events topics pipeline, wherein the OMS includes computer-readable medium storing instructions that, when executed by one or more processors, is configured to:
determine whether the retail store has sufficient current and future retail inventory to fulfill (i) an order as well as (ii) projected in-store purchases during an order fulfillment time period;
publish the orders to the pipeline of the SFM, using an application programming interface (API), in response to determining that the retail store has sufficient current and future retail inventory to fulfill the order as well as the projected in-store purchases during the order fulfillment time period, wherein publishing the orders comprises updating a fulfillment database to include the orders that are available for processing and fulfillment instead of transferring information about the orders to the SFM, wherein publishing the order to the pipeline permits for the order to be made available between the OMS and the SFM without requiring direct communication that includes one or more messaging protocols and message acknowledgements between the OMS and the SFM; and
transmit the orders to the WMS to be fulfilled using the warehouse inventory in response to determining that the retail store has insufficient current and future retail inventory to fulfill the orders and the projected in-store purchases during the order fulfillment time period;
receiving, by the fulfillment database, the orders to be fulfilled from the retail inventory contained in the retail store, the fulfillment database being dynamically updated, by the OMS, to include the current orders that are available for processing and fulfillment from the retail inventory;
interfacing, by an SFM API with multiple different store-based fulfillment systems that each fulfill orders and are decoupled from the SFM, wherein the SFM API includes multiple different store-based fulfillment API components that interface with each of the multiple different store-based fulfillment systems, wherein the multiple different store-based fulfillment systems include computer-readable medium storing instructions that, when executed by one or more processors, are configured to (i) poll the respective store-based fulfillment API components for tasks for the current orders, (ii) obtain the tasks for the current orders that are published by the fulfillment database via the SFM API to the pipeline and the store-based fulfillment API components, (iii) attempt to fulfill the current orders based on performing the obtained tasks, and (iv) report fulfillment status information via the respective store-based fulfillment API components indicating whether the tasks were able to be completed based on current retail inventory;
monitoring, by an internal workflow processor, the pipeline for status of order fulfillment by the SFM;
publishing, by the internal workflow processor, status information to the OMS via the pipeline based on polling the multiple different store-based fulfillment systems for updates on performing the obtained tasks to fulfill the current orders via the SFM API and the store-based fulfillment API components;
closing, by the internal workflow processor, a current order based on one or more of the multiple different store-based fulfillment systems publishing an order completion status for the current order via the store-based fulfillment API components; and
in response to closing the current order, transmitting, by the internal workflow processor, confirmation that the current order has been closed to the OMS via the pipeline of the SFM and the SFM API.

10. The method of claim 9, wherein the multiple different store-based fulfillment systems include a stored-based shipment system that includes computer-readable medium storing instructions that, when executed by one or more processors, is configured to pick, pack, and ship the orders to customers from the retail inventory.

11. The method of claim 10, wherein the store-based shipment system includes a receive module that includes computer-readable medium storing instructions that, when executed by one or more processors, is configured to track inventory additions to the retail inventory from the WMS.

12. The method of claim 10, wherein the store-based shipment system includes a pick module that includes computer-readable medium storing instructions that, when executed by one or more processors, is configured to generate pick tasks for workers to perform within the retail store to obtain the items included in an order from the retail inventory.

13. The method of claim 10, wherein the store-based shipment system includes a pack module that includes computer-readable medium storing instructions that, when executed by one or more processors, is configured to generate shipment tasks for workers to perform to ship items that have been picked using the pick module.

14. The method of claim 9, wherein the multiple different store-based fulfillment systems include a store pick-up system includes computer-readable medium storing instructions that, when executed by one or more processors, that is configured to pick, pack, and prepare for in-store pickup by customers at the retail store.

15. The method of claim 14, wherein the store pick-up system includes an in-store pick-up system that includes computer-readable medium storing instructions that, when executed by one or more processors, is configured to generate pick tasks for a worker to perform to collect the items in the orders and to prepare them for pick-up at one or more designated areas within the retail store.

16. The method of claim 14, wherein the store pick-up system includes a curbside pick-up system that includes computer-readable medium storing instructions that, when executed by one or more processors, is configured to generate pick tasks for a worker to perform to collect the items in the orders and to prepare them for delivery to a customer's vehicle at one or more designated areas outside or near the retail store.

* * * * *